United States Patent [19]
Allain et al.

[11] 3,894,962
[45] July 15, 1975

[54] AGGREGATION OF PARTICLES OF RANEY COPPER CATALYST

[75] Inventors: Ronald J. Allain; David G. Braithwaite, both of Brookhaven, Miss.

[73] Assignee: Nalco Chemical Company, Oak Brook, Ill.

[22] Filed: Apr. 20, 1973

[21] Appl. No.: 353,164

[52] U.S. Cl.......... 252/430; 252/477 Q; 252/477 R; 260/561 N
[51] Int. Cl............................................. B01j 31/02
[58] Field of Search............. 252/430, 477 R, 477 Q

[56] References Cited
UNITED STATES PATENTS

| | | | |
|---|---|---|---|
| 2,929,792 | 3/1960 | Arnold et al. | 252/430 |
| 2,930,762 | 3/1960 | Schoenenberger | 252/430 |
| 3,203,903 | 8/1965 | Van Olphen | 252/430 X |
| 3,255,027 | 6/1966 | Tacsma | 252/477 R X |
| 3,345,319 | 10/1967 | Colgan et al. | 252/430 X |
| 3,467,602 | 9/1969 | Koester | 252/477 R X |
| 3,573,038 | 3/1971 | Jung et al. | 252/477 Q X |
| 3,640,897 | 2/1972 | Restaino | 252/430 X |

*Primary Examiner*—Paul F. Shaver
*Attorney, Agent, or Firm*—John G. Premo; John S. Roberts, Jr.

[57] ABSTRACT

A method of utilizing fines of Raney copper alloy particles originally not greater than 125 mesh which consists of agglomerating these particles in a mix with a resin adhesive which is non-water soluble and forms a hardened film about the Raney alloy fines at moderate temperatures, as for example an artificial resin adhesive such as styrene or an epoxy type adhesive. Additionally in the mix is incorporated a channeling agent selected from halide-free water-soluble inorganic salts wherein the cation is selected from alkali metal and ammonium and the anion is selected from sulfate, nitrate, and carbonate.

After the adhesive hardens about the particles, the product is crushed and the inorganic salt is thoroughly removed, leaving additional catalytic sites along the empty channels caused by salt removal. Subsequently the resin-adhered alloy particles are leached with alkali metal hydroxide (preferred 15-20%) to remove aluminum values ranging from 90% to a percentile approaching total extraction. The process thus upgrades or resizes the Raney alloy fines from about 125 mesh to a size range of 10-20 mesh. The leaching with alkali metal hydroxide converts the resin-bonded alloy particles to active Raney copper particles also in the size range 10-20 mesh. These Raney copper particles find utility in the hydration of acrylonitrile to acrylamide.

5 Claims, No Drawings

AGGREGATION OF PARTICLES OF RANEY COPPER CATALYST

THE INVENTION

The present invention is directed to the resizing of fines which are produced when a Raney copper alloy is pulverized or mechanically broken up. The Raney alloys are well known and derive their name from Murray Raney, an American inventor and patentee (see, for example, U.S. Pat. Nos. 1,628,190 and 1,915,473). The alloys are usually binary alloys which as one component utilize aluminum and as the other component may utilize copper, nickel, etc.

In the generalized process a mixture of Raney copper alloy fines not greater than 125 mesh, a non-water soluble adhesive, and a water-soluble inorganic salt are mixed until the adhesive hardens about the particles. The adhesive-bonded alloy is crushed and results in larger resin or adhesive-bonded alloy particles in the size range 10–20 mesh. Subsequently, the inorganic salt is thoroughly washed out, leaving channels for later utilization as catalytic sites. The resin-bonded particles are then leached with an alkali metal hydroxide to remove at least 90% of the aluminum from the alloy and to produce catalytically active Raney copper particles also in the size range of at least 20 mesh and specially suitable in the hydration of acrylonitrile to acrylamide.

THE RANEY COPPER ALLOY

In the present invention, the starting Raney copper alloy is a melt product which is a binary alloy of copper and aluminum. This alloy usually varies by weight percent in a 60/40 copper/aluminum to 50/50 copper/aluminum.

It has been found that in the size reduction of a Raney copper alloy (as, for example, 50% copper, 50% aluminum) about 50% of the alloy metal produced is utilizable, being in the size range of about 10–20 mesh, and the balance is in fines of 125 mesh or less. It is a purpose of this invention to agglomerate these fines in a manner to convert to a Raney copper of suitable catalytic activity and specially a catalytic activity desirable in the hydration of acrylonitrile to acrylamide.

The present invention proposes to agglomerate the unusable fines to satisfactory particle size denoted by at least 20 mesh and practically in the area of 10–20 mesh by the use of a resin adhesive. As an added component to the agglomerating mix with the alloy and resin, a non-halide inorganic salt is added which functions as a channeling agent; i.e., when the salt is removed by aqueous wash from the resin-bonded alloy particles, it leaves channels which provide additional catalytic sites for reaction. Preferred channeling agents include non-halide alkali metal and ammonium salts of certain mineral acids, such as sulfuric, nitric as well as carbonic acid.

THE RANEY COPPER CATALYST

The term Raney copper catalyst, or in short form Raney copper, denotes the end product of the present invention wherein the aluminum values have been leached from the alloy by treatment with sodium hydroxide, preferably at 15–20% concentration and a preferred operating temperature below 30°C. With reference to these process parameters, there is art both in patent and literature denoting that different leaching concentrations and temperatures will operate to some degree. The Raney copper and the Raney metals generally are characterized by what has been called a foraminate structure or a skeletal structure where the copper remains as a skeleton after the removal of the aluminum. The amount of aluminum removed in the present process appears substantially above the optimum values recommended in the prior art. For example, in Groggins, Unit Processes in Organic Synthesis, 1958, page 435 bottom, there is recommended aluminum extraction preferred 15–20% and operable up to 50%. In the present process, operating with fines, extraction of 90% of the aluminum is achieved and in many cases a total extraction is approached, with the product exhibiting the necessary skeletal structure and not exhibiting unwanted softness. The leaching step produces a Raney copper catalyst also in the particle size of at least 20 mesh and it has been found that the adhesion of the resin-bonded particles is superior to that of the original Raney alloy composed of aluminum and copper, which is relatively fragile.

PRIOR ART 1,915,473, Raney (above) - At page 3, column 2, lines 86–91, the patentee comments on the sizing problem in using his catalyst, "The material need not necessarily be pulverized to a fine powder but it is a good practice to prepare a given weight of the catalytic material in a form having as large a surface as possible, particularly when the catalytic material is to be used in a liquid medium." U.S. Pat. No. 1,937,489 Jenness, to Intermetal Corp. - In a hydrogenation reaction utilizing foraminate nickel catalyst, the patentee states, at page 4, that a particle size of the order of fineness of 200 mesh is satisfactory.

German DOS 2,164,185 Mitsui Toatsu Chemicals - This application relates to hydration of nitriles such as acrylonitrile or methacrylonitrile to the corresponding amides utilizing as reactivating agents an aqueous solution of a compound selected from sodium hydroxide, potassium hydroxide, calcium hydroxide, sodium chloride, potassium chloride, calcium chloride, sodium carbonate, potassium carbonate, sodium cyanide, potassium cyanide, ammonia, ammonium hydrochloride, ammonium sulfate, and ammonium oxalate.

Canadian Pat. No. 899,380 Mitsui Toatsu Chemicals - This patent describes a process for the hydration of acrylonitrile and methacrylonitrile to the corresponding amides. This patent, which may use a Raney copper catalyst, is directed to the production of acrylamide or methacrylamide using as a water donor alkanols, glycols, cyclohexanol, etc.

THE ADHESIVE

The resin adhesive utilized should be non-water soluble in order to withstand the leaching action of water and alkali later in the process and in its subsequent use as a catalyst in the hydration of nitriles to amides. Additionally, the adhesive should be hardenable or capable of forming a hardened film about the Raney alloy fines at moderate or room temperatures. Preferred adhesives include styrene types which harden to homopolymers and copolymers of styrene and its analogs, e.g., polystyrene, styrene divinyl benzene. Epoxy adhesives such as the Epon resins (Shell) may also be utilized and such are described as condensation products of epichlorohydrin and bisphenol A.

THE CHANNELING SALT

In the agglomeration mix, an inorganic salt is added whose purpose is to provide greater surface area in the basic activity of the catalyst rather than regenerating the catalyst, and thus may be contrasted with the prior art German Pat. application DOS No. 2,164,185, noted above. It has further been found that in this invention the presence of halide is deleterious to the channeling function and this factor also contrasts with the aforesaid German DOS publication.

In the present invention, the most preferred inorganic salts utilized are alkali metal bicarbonates and sulfates, as for example, sodium bicarbonate and sodium sulfate. Other operable water-soluble halide-free inorganic salts include alkali metal and ammonium sulfates, nitrates, and carbonates, which are exemplified by potassium nitrate, sodium nitrate, lithium nitrate, potassium carbonate, sodium carbonate, potassium sulfate, ammonium nitrate, etc.

The term channeling is given to the function of this restricted group of salts which are temporarily incorporated in the agglomeration mix together with adhesive and the Raney copper alloy fines. When the adhesive has hardened in the agglomerated fines, the adhesive-bonded alloy is crushed and is found to have the particle size in the range of 10–20 mesh. Then the inorganic salt is removed by aqueous wash and channels are thus left in the structure of the resin-bonded alloy fines. This so-called channeling which occurs when the inorganic salt is removed leaves added catalytic sites for reaction. Additionally, for later utilization of the product, it is of prime importance that, after its temporary function during the agglomeration, the inorganic salt be thoroughly removed by aqueous wash.

As stated before, it was found that halides, e.g., chlorides, give deleterious results as channeling agents, especially as measured by the catalytic activity in its use in the hydration of acrylonitrile to acrylamide.

PROPORTIONS

The proportions of the ingredients of the agglomerating mix which comprise the Raney copper alloy fines, the resin adhesive, and the inorganic salt are by weight preferably used equi-parts. However, the ratio of the alloy fines may be varied up to 50/25/25 fines/resins/salt. The agglomeration mixture reaction is conducted at about room temperature and at atmospheric pressure. Further, in the conversion of the Raney alloy to Raney copper catalytic material, a solution of sodium hydroxide is preferably utilized at 15–20% strength and preferably at a temperature below 30°C.

The activation of the alloy or removal of the aluminum by sodium hydroxide here removes about 90% by weight of the total aluminum content and, in some cases, approaches total extraction of aluminum.

EXAMPLE 1

Preparation of Agglomerated Raney Copper 60 g. of Raney copper alloy fines (less than 125 mesh), 60 g. of sodium bicarbonate, and 60 g. of styrene pre-resin mix were blended together. The appropriate amount of activator was then added and the mixture allowed to set. This agglomerated alloy was crushed. It was found that now the majority of the partiicles were larger than 20 mesh. The $NaHCO_3$ was then leached out thoroughly with water. The alloy was converted to Raney copper by reacting with 15–20% NaOH while maintaining the temperature below 30°C.

EXAMPLE 2

Utilization of Agglomerated Raney Copper in the Hydration of Acrylonitrile to Acrylamide 45 g. of the agglomerated Raney copper as prepared in Example 1 (which contains 15 g. Cu) was added to 75 g. of acrylonitrile and 225 g. water. This mixture was heated in a pressure vessel at 105°C for 1.5 hours. Analysis showed 70% conversion to acrylamide.

The same procedure was repeated three times reusing the same catalyst each time. On the fourth run, a conversion of 70% was obtained in 3 hours. A comparison with a Raney copper catalyst which had not been agglomerated showed that the results were analogous.

EXAMPLE 3

Variation of Channeling Agents

Utilizing the procedure of Example 2 and using $NaHCO_3$ as a channeling agent, it was found that where insufficient water was used to remove the inorganic salt, the conversion results decreased.

An additional experiment was carried out utilizing $Na_2SO_4$ in place of $NaHCO_3$, and similar yields were obtained. However, when NaCl was substituted for $NaHCO_3$, there were very poor conversions of acrylonitrile to acrylamide.

We claim:

1. A method of aggregating fines of Raney copper alloy particles not greater than 125 mesh which consists of agglomerating said fines in the presence of a non-water soluble resin adhesive selected from the group consisting of styrene adhesives and epoxy adhesives and a halidefree water-soluble inorganic salt channeling agent selected from the group consisting of an inorganic salt in which the cation is alkali metal or ammonium and the anion is selected from a member of the group consisting of sulfate, nitrate, carbonate, and bicarbonate, hardening said adhesive about said particles, crushing the adhesive-bonded particles, and subsequently thoroughly leaching out the inorganic salt with water and converting the adhesive-bonded agglomerated alloy particles with 15–20% alkali metal hydroxide at a temperature less than 30°C to produce catalytically active Raney copper with a particle size of at least 20 mesh.

2. The method according to claim 1 wherein the channeling agent is sodium bicarbonate.

3. The method according to claim 1 wherein the channeling agent is sodium sulfate.

4. The method according to claim 1 wherein the resin adhesive is a styrene adhesive.

5. The method according to claim 1 wherein the resin adhesive is an epoxy adhesive.

* * * * *